2,900,363

PREPARATION OF CARBOXYALKYL POLYSILOXANES

Ben A. Bluestein, Schenectady, N.Y., assignor to General Electric Company, a corporation of New York No Drawing. Application March 20, 1957
Serial No. 647,221

6 Claims. (Cl. 260—46.5)

This invention is concerned with a method for making carboxyalkyl polysiloxanes. More particularly, the invention relates to a process for making carboxyalkyl (e.g., carboxyethyl) polysiloxanes directly from a hydrolyzable composition containing as an essential ingredient a cyanoalkylchlorosilane, which process comprises effecting hydrolysis of the cyanoalkylchlorosilane in a hydrolyzing medium comprising concentrated aqueous hydrochloric acid of at least 20 weight percent concentration.

The cyanoalkylchlorosilanes which may be employed in the practice of the present invention have the formula

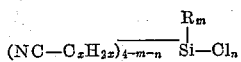

where R is a lower alkyl radical having less than 4 carbon atoms, $m$ is a whole number equal to from 0 to 1, inclusive, and $n$ is a whole number equal to from 2 to 3, inclusive, the total of $m+n$ being equal to at most 3, and $x$ is an integer equal to at least 2, e.g., from 2 to 8 or more. Included among such monomeric compounds are, for instance, cyanoethyltrichlorosilane, di-(cyanoethyl) dichlorosilane, cyanoethylmethyldichlorosilane, cyanoethyl ethyldichlorosilane, cyanopropyltrichlorosilane, cyanobutyl propyldichlorosilane, etc. Compositions of this type may be prepared by effecting reaction between (1) an olefinic hydrocarbon having a cyano group attached thereto, e.g., acrylonitrile, methacrylonitrile, allyl cyanide, crotyl cyanide, α-chloroacrylonitrile, etc. and (2) a silane having silicon-bonded hydrogen, e.g., trichlorosilane ($SiHCl_3$), a lower alkyl dichlorosilane, for instance, methyldichlorosilane ($CH_3SiHCl_2$), ethyldichlorosilane, etc. Such addition is catalyzed by certain bases, for instance, tertiary amines, sodium methylate, secondary amines, etc. More particular directions for preparing these cyanoethyl chlorosilanes are found in the copending applications of Maurice Prober, Serial No. 401,702 and 401,703, both filed December 31, 1953, the latter now U.S. Patent No. 2,835,690, issued May 20, 1958, and assigned to the same assignee as the present invention, both of which applications by reference being made part of the disclosures of the instant application. Many of these cyanoalkyl chlorosilanes are disclosed and claimed in the copending application of Glenn D. Cooper and Maurice Prober, Serial No. 401,704 filed December 31, 1953.

Previous methods for hydrolysis of these cyanoalkyl chlorosilanes have involved, first, hydrolysis of the chlorosilane itself to the cyanoalkyl polysiloxane state, and thereafter conversion to the carboxyalkyl polysiloxane state by suitable hydrolysis techniques. This, of course, involves a two-step process and, in addition to being expensive and time-consuming, often gives incomplete hydrolysis of the cyano groups. By means of my invention, it is possible to effect hydrolysis of the cyano alkyl chlorosilane either alone or in combination with other alkyl chlorosilanes free of silicon-bonded cyanoalkyl radicals, such as, for instance, methyltrichlorosilane, dimethyldichlorosilane, trimethylchlorosilane, diethyldichlorosilane, ethyltrichlorosilane, etc., with the concentrated hydrochloric acid, to give in one step not only hydrolysis of the silicon-bonded chlorines to form polysiloxane linkages, but also to effect hydrolysis of the cyano group and convert it to the carboxyl group. The carboxyl group is available for further reaction and increases the functionality of the organopolysiloxane. Thus, the carboxyl group can be esterified with alcohols or other similar esterifying ingredients, or the carboxyl groups may be treated in other ways to form even still more different types of reactive groupings on the aliphatic linkage between the carboxyl group and the silicon of the organopolysiloxane.

One of the features of my invention which is particularly attractive from an economic viewpoint is the fact that this dual hydrolysis of silicon-bonded chlorine and hydrolysis of the cyano group to carboxyl groups with the concentrated aqueous hydrochloric acid can be effected at room temperature, for instance, at temperatures ranging from about 20 to 50° C., and still obtain substantially quantitative yields. Temperatures above 50° C. may be employed but too high temperatures should not be used because there may be a tendency for the reaction product to undesirably increase in molecular weight and become infusible and insoluble.

The fact that hydrolysis of the cyanoalkylchlorosilane in concentrated HCl gave the above results was unexpected and in no way could have been predicted because hydrolysis of, for instance, cyanoethylchlorosilanes (either alone or combined with other organochlorosilanes), even in an excess of water, gave a polymer which still had a large amount of cyano groups despite the presence of HCl as a result of the hydrolysis reaction. The polymer thus obtained gave no evidence of having any carboxyethyl groups.

The aqueous concentrated hydrochloric acid solution in which hydrolysis is carried out is preferably of a concentration, by weight, ranging from about 20 to about 40 percent or more.

In effecting hydrolysis, there should be employed sufficient concentrated hydrochloric acid so that the water in the latter solution is adequate to effect hydrolysis of all the silicon-bonded chlorine atoms in the cyanoalkylchlorosilane and any other co-hydrolyzable organochlorosilanes being intercondensed or co-hydrolyzed, as well as being sufficient to convert the cyano group to the carboxyl group. Thus, preferably one employs at least one mol. of water in the aqueous hydrochloric acid solution for each silicon-bonded chlorine atom plus two mols of water for conversion of the cyano group. As a minimum, the molar concentration when hydrolyzing, e.g., cyanoethyltrichlorosilane, is about 3.5 mols water per mol of cyanoethyltrichlorosilane. If cohydrolyzable silanes, such as methylchlorosilanes, are employed with the cyanochlorosilanes, the total molar requirements of water may even be less due to the fact that these additional chlorosilanes are not requiring the water for conversion of cyano groups to carboxyl groups. Since the hydrolysis of the chlorosilane or mixture of chlorosilanes will introduce additional HCl in the reaction mixture, and this will in turn increase the hydrogen chloride content or concentration in the reaction mixture, it will be apparent that even lower ranges of HCl concentration can be used quite effectively in causing the combined hydrolysis of the silicon-bonded chlorine and of the cyano group. Excesses of concentrated aqueous HCl (e.g., containing up to 4 to 8 mols of HCl and water) are not detrimental in the process.

In order that those skilled in the art may better understand how the present invention may be practiced, the following examples are given by way of illustration and not by way of limitation. All parts are by weight.

The cyanoethyltrichlorosilane employed in the following examples was prepared by effecting reaction between equimolar amounts of acrylonitrile and trichlorosilane using about 5 mol percent tributylamine as a catalyst as is more particularly recited in the copending application of Maurice Prober, Serial No. 401,702, filed December 31, 1953 and assigned to the same assignee as the present invention.

EXAMPLE 1

94 parts cyanoethyltrichlorosilane were added with stirring to 225 parts of concentrated aqueous HCl containing about 35 percent HCl. The addition was carried out in about 10 minutes, at which time there was obtained a clear solution. The solution was neutralized with NaOH to a pH of about 5. Twice the volume of ethanol was added and a viscous liquid separated. This viscous liquid was washed with ethyl alcohol and vacuum-dried to give a hard solid. Infrared examination showed the presence of carboxyl groups. There was no evidence of any cyano groups.

EXAMPLE 2

Blends of trimethylchlorosilane with cyanoethyltrichlorosilane were hydrolyzed by adding with stirring the chlorosilane blend to an excess of aqueous concentrated hydrochloric acid at temperatures of about 25° to 28° C., the aqueous hydrochloric acid being about 30 percent HCl. Enough of the concentrated aqueous hydrochloric acid was used so that there was at least one mol of water per mol of silicon-bonded chlorine and two mols of water per mol of cyano group. Specifically, three parts of the 30 percent HCl per part of chlorosilane blend was used. The reaction products precipitated during the reaction period. This yielded solid resinous compositions which on infrared analysis showed no evidence of the presence of residual nitrile groups, and established the presence of carboxyethyl groups. In addition, each of the sample resins was heated at 110° C. and 200° C. for varying lengths of time to determine the weight losses at these temperatures. The following Table I shows the concentrations of trimethylchlorosilane as well as the weight losses of the various reaction products at the different temperatures.

*Table I*

| Sample No. | Mol [1] Percent $(CH_3)_3SiCl$ | Weight Loss (Percent) | | | |
|---|---|---|---|---|---|
| | | 110° C., 1 hr. | 200° C., 1 hr. | 110° C., 16 hrs. | 200° C., 16 hrs. |
| 1 | 10 | 2.7 | 5.7 | 3.9 | 7.1 |
| 2 | 50 | 11.1 | 14.4 | 12.2 | 16.8 |
| 3 | 75 | 22.5 | 12.3 | 20.2 | 32.8 |

[1] The remainder of the chlorosilane blend being cyanoethyltrichlorosilane.

The resinous products were composed of both trimethylsiloxy units and carboxyethylsiloxy units of the formulae $(CH_3)SiO_{1/2}$ and $HOOCC_2H_4SiO_{3/2}$.

EXAMPLE 3

In this example, varying molar concentrations of dimethyldichlorosilane were cohydrolyzed with cyanoethyltrichlorosilane employing aqueous concentrated HCl of 35 percent weight concentration, similarly as was done in Example 2. The weight ratio of the ingredients was the same as in Example 2. The reaction products precipitated from the hydrolysis reaction mixture, as in Example 2, and each of the resinous products obtained were heated for varying times and at different temperatures. In addition, infrared analysis of each of the resinous compositions was conducted; this analysis showed the absence of any cyano radicals and the presence of substantial quantities of silicon-bonded carboxyethyl groups in the polysiloxane. The following Table II shows the molar concentration of the dimethyldichlorosilane (the balance being cyanoethyltrichlorosilane), as well as the heat losses of the various resinous products obtained under the conditions cited in the table.

*Table II*

| Sample No. | Mol [1] Percent $(CH_3)_2SiCl_2$ | Weight Loss (Percent) | | | |
|---|---|---|---|---|---|
| | | 110° C., 1 hr. | 200° C., 1 hr. | 110° C., 16 hrs. | 200° C., 16 hrs. |
| 4 | 10 | 19.3 | 22.9 | 18.3 | 25.2 |
| 5 | 90 | 10.4 | 14.7 | 13.0 | 16.2 |

[1] The remainder of the chlorosilane blend being cyanoethyltrichlorosilane.

The resinous products were composed of both dimethylsiloxy units and carboxyethylsiloxy units of the formulae $(CH_3)_2SiO$ and $HOOCC_2H_4SiO_{3/2}$.

Instead of using cyanoethyltrichlorosilane, one can employ other cyanoorganochlorosilanes, many examples of which have been given above. In addition, the concentration of the cohydrolyzable lower alkyl chlorosilane can be varied within wide limits as is evident from the preceding examples, when cohydrolyzing the latter with, e.g., the cyanoethyltrichlorosilane, using the concentrated hydrochloric acid; thus, the cohydrolyzable blend may advantageously contain as low as from about 1 to 10 percent, by weight, of the cyanoalkylchlorosilane, e.g., cyanoethylthrichlorosilane. Obviously, the concentration of the hydrochloric acid may also be varied widely as mentioned previously, to obtain equivalent results. All the organopolysiloxanes made in the foregoing two examples containing varying amounts of intercondensed trimethylsiloxy units and dimethylsiloxy units were insoluble in water, but generally dissolved in strong bases, e.g., 20 percent NaOH.

The fact that the carboxyalkylpolysiloxanes, e.g., the carboxyethylpolysiloxanes, are insoluble in such solvents as hexane, diethyl ether, toluene, and acetone, recommends the polymers containing these carboxyethylsiloxy units for use in applications requiring resistance to such solvents, for instance, in gasket applications, electrical conductors, etc.

The compositions obtained in accordance with the process described above for hydrolyzing the cyanoalkylchlorosilanes, either alone or in combination with other lower alkyl chlorosilanes, may be considered as having the general formula

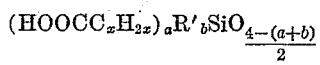

$$(HOOCC_xH_{2x})_aR'_bSiO_{\frac{4-(a+b)}{2}}$$

where R' is an alkyl radical (e.g., methyl, ethyl, butyl, hexyl, dodecyl, etc.), a has a value of from 0.01 to 2.0, and the sum of $a+b$ is from 1.0 to 2.5, inclusive, and $x$ has the meaning given above, it being apparent that in the polysiloxane chain there may be silicon atoms containing R' groups attached directly thereto in which the silicon atom does not have a carboxyalkyl, e.g., carboxyethyl, group attached thereto.

These carboxyalkylpolysiloxanes can be reacted with long-chain alcohols to make esters through the medium of the carboxyl group, which can then be used as plasticizers for organopolysiloxane resins, rubbers, etc., and also can have utility as plasticizers for polyvinyl halide resins, such as polyvinyl chloride resins, wherein the high temperature heat resistance of the organopolysiloxane residues can materially improve the properties of the polyvinyl halide resin while, at the same time, imparting plasticizing action to the latter resin.

The carboxyalkylpolysiloxanes prepared in accordance with the present invention can be used to make copper salts which can be employed as insecticides. Thus, the organopolysiloxane obtained by effecting reaction between concentrated HCl and cyanoethyltrichlorosilane can be dissolved in water and copper nitrate added thereto. The copper salt thus formed is advantageously washed with water to give a composition which can be useful in treating various materials to render them mildew resistant.

What I claim as new and desire to secure by Letters Patent of the United States is:

1. The process for making carboxyalkylpolysiloxanes which comprises hydrolyzing a composition containing as an essential ingredient a cyanoalkylchlorosilane of the formula

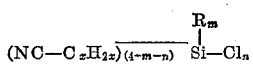

in a hydrolyzing medium comprising concentrated aqueous hydrochloric acid of at least 20 weight percent concentration, where R is a lower alkyl radical having less than four carbon atoms, $m$ is a whole number equal to from 0 to 1, inclusive, $n$ is a whole number equal to from 2 to 3, inclusive, the total of $m$ plus $n$ being equal to at most 3, and $x$ is a whole number equal to at least 2.

2. The process for preparing carboxyalkylpolysiloxanes which comprises hydrolyzing a mixture of ingredients containing as an essential ingredient a cyanoalkylchlorosilane of the formula

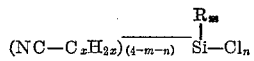

and another cohydrolyzable alkyl chlorosilane in a hydrolysis medium comprising concentrated aqueous hydrochloric acid of at least 20 weight percent concentration where R is a lower alkyl radical having less than four carbon atoms, $m$ is a whole number equal to from 0 to 1, inclusive, and $n$ is a whole number equal to from 2 to 3, inclusive, the total of $m+n$ being equal to at most 3.

3. The process for preparing carboxyethyl polysiloxanes which comprises hydrolyzing a mixture of ingredients containing cyanoethyltrichlorosilane and trimethylchlorosilane in a hydrolysis medium comprising concentrated aqueous hydochloric acid of at least 20 weight percent concentration.

4. The process for preparing carboxyethyl polysiloxanes which comprises hydrolyzing a mixture of ingredients containing cyanoethyltrichlorosilane and dimethyldichlorosilane in a hydrolysis medium comprising concentrated aqueous hydrochloric acid of at least 20 weight percent concentration.

5. The process for preparing carboxyethyl polysiloxanes which comprises hydrolyzing a mixture of ingredients containing cyanoethyltrichlorosilane, dimethyldichlorosilane and trimethylchlorosilane in a hydrolysis medium comprising concentrated aqueous hydrochloric acid of at least 20 weight percent concentration.

6. The process for preparing carboxyethyl polysiloxanes which comprises hydrolyzing a mixture of ingredients containing cyanoethyltrichlorosilane and methyltrichlorosilane in a hydrolysis medium comprising concentrated aqueous hydrochloric acid of at least 20 weight percent concentration.

References Cited in the file of this patent

UNITED STATES PATENTS

| | | |
|---|---|---|
| 2,443,898 | Ellingboe | June 22, 1948 |
| 2,687,418 | Sommer | Aug. 24, 1954 |
| 2,687,424 | Sommer | Aug. 24, 1954 |
| 2,723,987 | Speier | Nov. 15, 1955 |
| 2,776,306 | Cole | Jan. 1, 1957 |
| 2,855,381 | Sommer | Oct. 7, 1958 |

FOREIGN PATENTS

| | | |
|---|---|---|
| 1,116,725 | France | Feb. 6, 1956 |
| 1,116,726 | France | Feb. 6, 1956 |

OTHER REFERENCES

Wagner et al.: "Synthetic Organic Chemistry," (1953), John Wiley and Sons, Inc., New York, publishers, pp. 412–15.

Petrov et al.: "Doklady Akad. Nauk., "USSR 100 (1955), pp. 711–14.